US008660918B2

(12) United States Patent
Weber

(10) Patent No.: US 8,660,918 B2
(45) Date of Patent: Feb. 25, 2014

(54) VIRTUAL FINANCIAL AID OFFICE

(75) Inventor: Harry V. Weber, Simpsonville, SC (US)

(73) Assignee: Weber & Associates, Inc., Greenville, SC (US)

(\*) Notice: Subject to any disclaimer, the term of this patent is extended or adjusted under 35 U.S.C. 154(b) by 2884 days.

(21) Appl. No.: 10/054,689

(22) Filed: Nov. 13, 2001

(65) Prior Publication Data

US 2003/0093346 A1      May 15, 2003

(51) Int. Cl.
*G06Q 40/00* (2012.01)
(52) U.S. Cl.
USPC ............... 705/35; 705/38; 705/7; 379/201; 434/362
(58) Field of Classification Search
USPC .................. 705/38, 7, 35; 379/201; 434/362
See application file for complete search history.

(56) References Cited

U.S. PATENT DOCUMENTS

| | | |
|---|---|---|
| 5,001,769 A | 3/1991 | Reid-Green et al. |
| 5,239,462 A | 8/1993 | Jones et al. |
| 5,262,941 A | 11/1993 | Saladin et al. |
| 5,699,527 A | 12/1997 | Davidson |
| 5,797,133 A | 8/1998 | Jones et al. |
| 5,809,484 A | 9/1998 | Mottola et al. |
| 5,866,889 A | 2/1999 | Weiss et al. |
| 5,870,721 A * | 2/1999 | Norris .................. 705/38 |
| 5,903,879 A | 5/1999 | Mitchell |
| 5,940,812 A | 8/1999 | Tengel et al. |
| 5,940,813 A | 8/1999 | Hutchings |
| 5,966,699 A | 10/1999 | Zandi |
| 5,995,947 A | 11/1999 | Fraser et al. |
| 6,016,335 A | 1/2000 | Lacy et al. |
| 6,029,153 A | 2/2000 | Bauchner et al. |
| 6,112,190 A | 8/2000 | Fletcher et al. |
| 6,131,810 A | 10/2000 | Weiss et al. |

(Continued)

OTHER PUBLICATIONS

Marybeth Regan—"Utilizing the Internet in education", College and University, Washington: Spring 2001 vol. 76, Iss, 4; p. 37, 8pgs.*

(Continued)

*Primary Examiner* — Harish T Dass
(74) *Attorney, Agent, or Firm* — Dority & Manning, PA

(57) ABSTRACT

A virtual system and method is disclosed for administering, evaluating, and processing financial aid for post-secondary students. The subject virtual system is preferably hosted in a web-based environment and is accessible by and/or interactive with various entities such as students, educational institutions, student financial aid processing centers, government agencies related to educational funding, and loan guarantors. Particular features and methodology are preferably provided in accordance with the virtual system such that a student can conveniently obtain educational funding within a completely automated and integrated online process. The virtual system preferably provides features such as direct links to applications for federal funding, an electronic messenger service to communicate among networked system entities, and a financial aid estimator to predict amounts of aid for which a student is eligible. A user of the virtual system can apply for a personal identification number (PIN) and complete a student interview process to initiate a financial aid processing. Such information is then preferably combined into a personalized user file with information electronically obtained and verified from outside sources. This file then undergoes a review process, including compliance checks, quality control, and loan certification. Once a file is sufficiently reviewed, aid can then be routed to a student's specified institution for use towards his or her educational expenses. Review and reporting services are preferably available throughout this automated process such that a user can conveniently track certain information, including progress of the financial aid process steps.

21 Claims, 7 Drawing Sheets

(56) References Cited

U.S. PATENT DOCUMENTS

| | | | |
|---|---|---|---|
| 6,233,566 B1 | 5/2001 | Levine et al. | |
| 7,062,462 B1 * | 6/2006 | Ireland et al. | 705/38 |
| 2002/0038285 A1 * | 3/2002 | Golden et al. | 705/38 |
| 2002/0178038 A1 * | 11/2002 | Grybas | 705/7 |

OTHER PUBLICATIONS

PDF document—Student aid related web pages (2).*

PDF document—File transfer protocol (FTP).*

"Financial Aid Prospecting—Online: The Internet Is Loaded With Valuable Financial Aid Information, but Few Campus Web Sites Are Designed to Help Them Find It"; Terrell, Kenneth. Black Issues in Higher Education. Reston: Oct. 28, 1999. vol. 16, Iss. 18; p. 38.*

29-page printoff from www.enconcert.com website, Copyright 2000; printed Sep. 10, 2001.

Gateway, Inc. advertisement (The Technology Forum) from The Chronicle of Higher Education dated Oct. 11, 2002, Copyright 2002.

* cited by examiner

VIRTUAL FINANCIAL AID OFFICE

BACKGROUND OF THE INVENTION

The present invention generally concerns a virtual system and automated method for administering, evaluating, and processing federal student financial aid for post-secondary students. More particularly, the present subject matter pertains to an interactive network directed to students, educational institutions, and financial aid administrators and providers. Participants in such a network preferably have access to a web-based system that provides a plurality of financial services and features embodied within a virtual financial aid office (VFAO). Particular methodology is preferably employed in conjunction with the web-based system to manage and administer a comprehensive student financial aid process in an automated and integrated fashion.

The plight of a typical student seeking financial aid involves many complicated steps, interaction with a variety of different entities, and the provision and assessment of vast amounts of information. There are several things that need to be done when a student first decides that he or she wishes or needs to obtain funding for the expenses related to a higher education. A student must typically first be enrolled or planning to enroll in an approved post-secondary educational institution. Such an institution may correspond to a technical school, college, university, or other institution approved for providing higher education funding under Title IV of the Higher Education Act (HEA). The process is so complicated and non-intuitive that most such institutions provide some level of personnel dedicated to assisting students with the process of funding the cost of tuition and other education-related expenses. A student or his or her parents or guardians must then typically provide information to an institution's financial aid personnel. This information must then be analyzed, often manually, by the financial aid office or other established entities (such as various government agencies) to determine aid eligibility and corresponding monetary amounts. Only then, after some finite period of time, can a student typically know if or how much funding he or she might receive. This may raise potential concerns for a prospective student, since time may be of the essence as he or she attempts to balance the demands of everyday living with life-impacting decisions.

The different entities involved in such a financial aid process are often numerous and typically include students, educational institutions, government agencies, financial lenders, etc. The interaction among these groups typically involves a lot of paperwork, manually transferred correspondence, and other factors that combine to create a lengthy and involved process and flow of information. It is thus desirable to reduce time and complications inherent to this interactive process.

While various aspects and alternative features are known in fields related to financial matters and interactive systems for handling such matters, no one design has emerged that generally incorporates typical student financial aid methodology in an automated and integrated system, which serves both the student and the educational institution.

Known technology that relates to interactive systems for handling particular education-related aspects is available. U.S. Pat. No. 5,809,484 relates to a method and apparatus for funding education by acquiring shares of students future earnings. A telephone registration system for schools is disclosed in U.S. Pat. No. 6,016,335.

Several other examples of interactive systems dedicated to a variety of financial matters are provided by other patents. U.S. Pat. No. 5,904,812 discloses an apparatus and method for automatically matching a best available loan to a potential borrower. U.S. Pat. No. 5,797,133 provides a description of a method for automatically determining the approval status of a potential borrower and U.S. Pat. No. 5,995,947 discloses an interactive mortgage and loan information and trading system.

A known web-based system that purports to provide interactive student aid services is available on-line from Nelnet at www.enconcert.com.

Additional exemplary background references in the area of financial matters and methods or systems therefor include U.S. Pat. Nos. 5,966,699; 5,699,527; 5,001,769; 6,131,810; 6,029,153; 5,940,813; 5,866,889; 5,262,941; 5,239,462; 5,903,879; and 6,233,566 B1.

The disclosure of all the foregoing United States patents and other known technology are hereby fully incorporated into this application by reference thereto.

BRIEF SUMMARY OF THE INVENTION

In view of the discussed drawbacks and shortcomings encountered in the field of financial and/or education related matters, an improved system and process for providing and effecting virtual student financial aid has been developed. Thus, broadly speaking, a general object of the presently disclosed technology is to provide a virtual system for offering financial aid to a student and corresponding methodology for facilitating such a financial aid process.

It is another principal object of the present subject matter to provide an automated financial aid system in a web-based environment such that students, financial aid processors, educational institutions, and others can independently and simultaneously access and interact with the on-line financial aid system.

It is yet another principal object of the disclosed technology to provide particular methodology for use in conjunction with a web-based system for managing and administering a comprehensive student financial aid process.

It is another object of the present subject matter to provide a virtual financial aid office such that a student eliminates or reduces the time-consuming need to personally visit or otherwise interact with a traditional student financial aid office as well as the need to complete and deliver related paperwork associated with a financial aid process. Not only is paperwork preferably reduced, but staffing needs for various financial entities may also be scaled back as a result of implementing the subject virtual financial aid office.

Yet another general object of the present invention is to provide a versatile financial aid tool to a variety of different post-secondary educational institutions, including technical schools, colleges, universities and others. Versatility is also preferably incorporated into the type of financial aid offered to a student; such varied types of aid typically include federal funding, including grants, loans, etc., private loans, scholarships, and other available sources of funding.

It is another object of the present subject matter to provide a virtual financial aid system that offers select features to various system users. Automated communication tools are preferably available such that users can contact and relay questions or information among other system users. A financial aid estimation feature is preferably available to a user for predicting typical amounts of financial aid a student may be eligible for. Reporting systems and report generators may be provided to educational institutions for evaluating and for recording financial aid matters of its students.

It is yet another object of the subject system to provide particular methodology for evaluating and processing financial aid applications and related information. Evaluation preferably includes individual file review, quality control, and aid certification.

It is a further object of the present subject matter to provide a remote system for connecting a customer utility load, wherein rapid data reads and other safeguards are employed to ensure a safe and effective load connection.

A still further object of the present technology is to provide an integrated financial aid system that is designed such that the system can evolve and comply with higher education funding programs and regulations that are constantly changing and adapting without a need for complete redesign of the financial aid system.

Additional objects and advantages of the present subject matter are set forth in, or will be apparent to, those of ordinary skill in the art from, the detailed description herein. Also, it should be further appreciated that modifications and variations to the specifically illustrated, referred and discussed features and steps hereof may be practiced in various embodiments and uses of the invention without departing from the spirit and scope thereof, by virtue of present reference thereto. Such variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of this invention may include various combinations or configurations of presently disclosed features or elements, or their equivalents (including combinations of features, parts, or steps or configurations thereof not expressly shown in the figures or stated in the detailed description of such figures). One exemplary such embodiment of the presently disclosed technology is a web-based application for providing a mutli-level financial aid to a user.

Such a web-based application preferably features integrated and automated on-line financial aid features. It also preferably comprises an information collection service and corresponding financial aid estimation service. Various personal and financial information is requested and collected via the information collection service. This information is then preferably used to generate a predicted amount of monetary aid potentially available to a user for a student's education-related expenses.

Yet another exemplary embodiment of the present subject matter relates to a web-based communication network comprising a financial aid estimation service, a student interview service, a file processing service, and a reporting service.

More preferably, the web-based communications network is utilized for automatically administering a controlled relationship among students, educational institutions, and student financial aid processors and for providing the aforementioned selectable services that relate to financial aid application and administration. The financial aid estimation feature is preferably used to predict an amount of financial aid that may be available to a particular student. The student interview feature preferably corresponds to a user providing requested information related to personal demographics, financial information, and educational agenda. A student financial aid processor preferably has access to the file processing feature to review information about a student and to determine eligibility for various types of financial aid. Educational institutions preferably utilize the reporting feature to generate reports of students and their corresponding financial aid package information.

Another present exemplary embodiment of the subject technology is an automated method for providing financial aid to a student. The automated method is preferably employed in conjunction with an interactive on-line financial aid system and comprises several steps. A first exemplary step corresponds to a step of generating a personalized identification element for a user to the online financial aid system. This personal identification element is preferably then inputted to the on-line system for gaining access to selected features and services thereof. Another step in such an exemplary method corresponds to obtaining requested demographic, financial, and education related data from a user and then relaying this information to a financial aid processor. Information obtained is then preferably reviewed to determine whether a student is eligible or ineligible for certain types of financial aid.

Additional embodiments of this methodology may often incorporate selected other steps into its virtual financial aid process. One such step may correspond to offering a financial aid estimate to a user. Such an estimate is typically calculated from initial information provided by a user to the on-line financial system that is evaluated with respect to established aid qualification guidelines. Another potential step is to establish a financial aid file for a user. Such a file may preferably include hard copies of obtained student information. Yet another step that may preferably be incorporated with selected embodiments of the present subject matter is to perform a quality control and certification check of a student's financial aid information. Such a quality control check may be used to ensure that all other steps are sufficiently completed, including loan certification, such that a student may properly receive his or her financial aid.

Still further exemplary embodiments of the presently disclosed technology relate to a method for processing an on-line student financial aid application. Such an application typically contains various information such as personal demographic facts, financial data, and educational endeavors. Multiple levels of review and certification are implemented to ensure proper documentation, review compliance issues, and certify student financial aid.

Additional embodiments of the present subject matter, not necessarily expressed in this summarized section, may include and incorporate various combinations of aspects of features, components, or steps referenced in the summarized objectives above, and/or other features, components, or steps as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 5 demonstrates aspects and steps corresponding to an exemplary process of establishing and reviewing a user file in accordance with the virtual financial aid system of the present subject matter;

FIG. 6 demonstrates aspects and steps corresponding to an exemplary process of reviewing a student financial aid processing center file in accordance with the presently disclosed technology; and FIG. 7 demonstrates aspects and steps corresponding to an exemplary process of performing quality control in accordance with an exemplary virtual financial aid office system.

Figure 1:
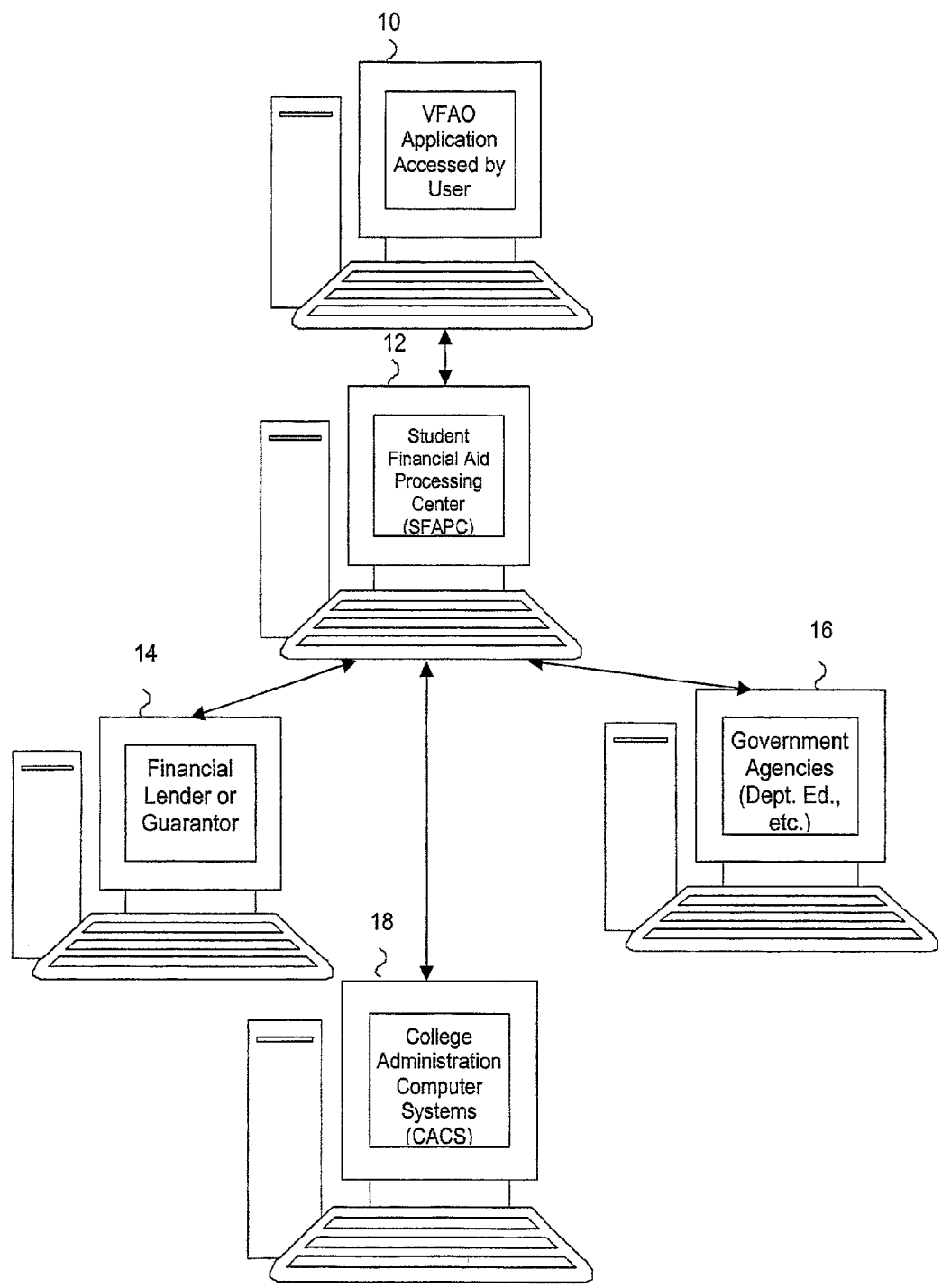
FIG. 1 is a block diagram representation of an exemplary interactive network for use in conjunction with a virtual financial aid system in accordance with the present subject matter.

Repeat use of reference characters throughout the present specification and appended drawings is intended to represent same or analogous features, elements, or steps of the invention.

DETAILED DESCRIPTION OF THE DRAWINGS

As discussed in the Brief Summary of the Invention section, the present subject matter is particularly concerned with an interactive system for evaluating, processing, and administering student financial aid. Such an interactive system is preferably provided through the Internet or other web-based environment and selectable services are available to a user from the interactive application. Examples of entities that may use aspects of the interactive utility application include students, financial aid processing centers, educational administrators, and financial lenders. Such an interactive system is provided such that a student can apply for and ideally obtain financial assistance for education-related expenses in a virtual environment without having to interact with typical financial aid personnel. Since typical interaction with various entities is preferably reduced or eliminated, the on-line system must be able to interface among entities that play a part in a traditional financial aid process. These include some of the aforementioned groups and others, including various government agencies. A block diagram relating such entities and selected interaction thereof is displayed in FIG. 1.

Figure 2:
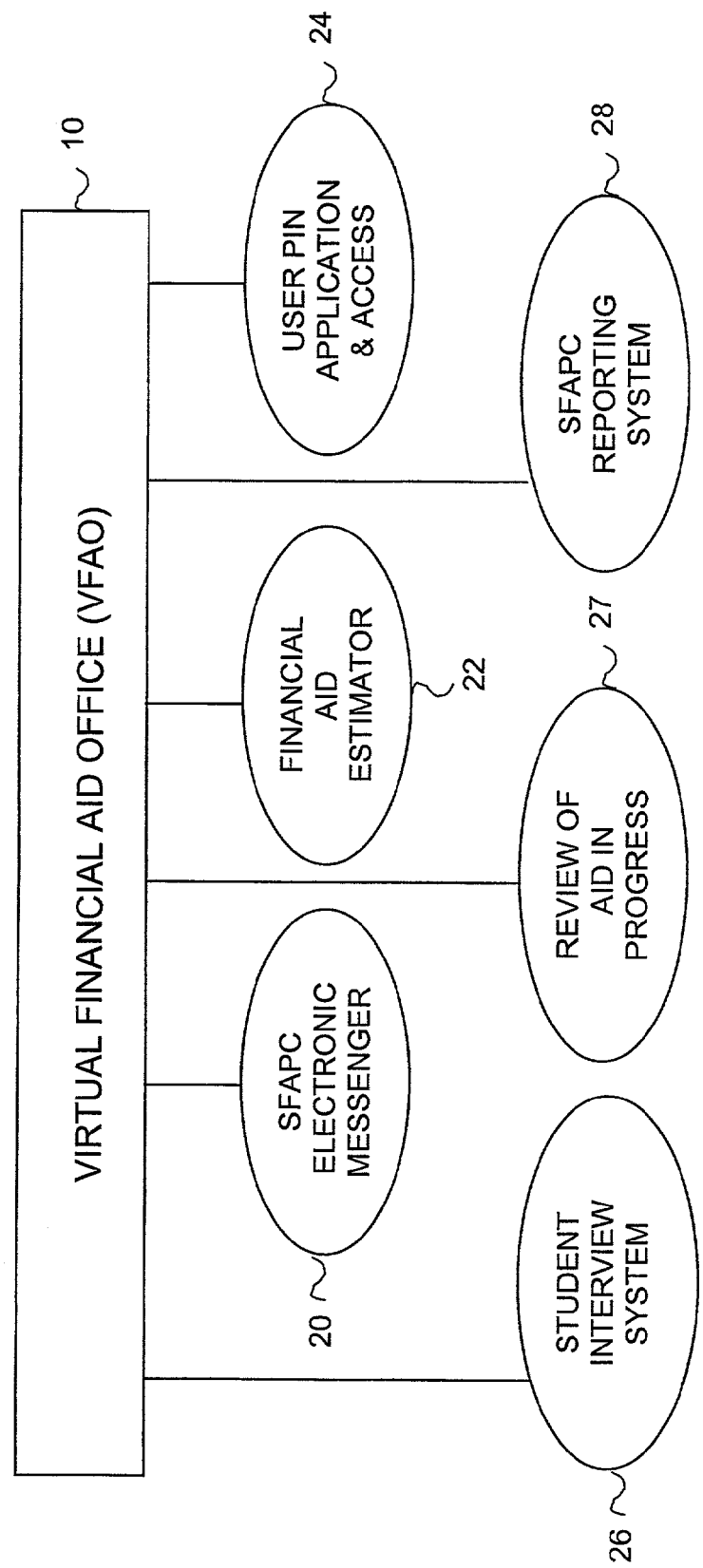
FIG. 2 illustrates exemplary services and features of a virtual financial aid office and system in accordance with the presently disclosed technology.

A plurality of various features and services are available to a user from the subject interactive system. Such features and services are selected and utilized in conjunction with particular methodology for obtaining financial assistance. FIG. 2 displays a plurality of services that are available to a user within the subject virtual financial aid office, and FIG. 3 outlines general methodology incorporated with the process of obtaining student aid via the interactive system.

An initial process related to obtaining financial aid occurs when a user proceeds to the on-line financial aid system and provides initially requested information to the system. After providing the predetermined initial information, a user may then obtain a financial aid estimate. The estimate is intended to provide a prediction of the amount of money a given student will be eligible to receive for educational expenses. If the student is satisfied with this estimate, he or she can then proceed to apply for various types of financial aid. A first step in the application process is to obtain a personal identification number (PIN), which will be required from a user for future access to the on-line financial aid system. A second step of the application process is to fill out various forms for federal student assistance. Once these forms are completed, an individual file is established for each student. A student financial aid processing center is preferably in charge of establishing and maintaining individual files for a plurality of students and institutions. Information will be verified by outside entities, including educational institutions and government agencies. Once all required information for a student's file is received, the student financial aid processing center begins an extensive and particular process of reviewing a student's file. Preliminary review establishes verification of required documents, and quality control assures that established criteria are met for each reviewed student. Once a file is completely reviewed, loans and other aid can then be certified. FIGS. 4 through 7, respectively, describe process flow that occurs within various states of the financial aid process.

It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar components or features not expressly mentioned which perform the same or similar function. Similarly, certain process steps may be interchanged or employed in combination with other steps to yield additional exemplary embodiments of an interactive utility system.

Reference will now be made in detail to the presently preferred embodiments of the subject virtual financial aid office. Referring now to the drawings, FIG. 1 provides a block diagram representation of an exemplary interactive network for use in conjunction with the subject virtual financial aid system. The virtual financial aid system facilitates the management and administration of student aid as well as the interaction among various involved entities. The subject virtual financial aid office (VFAO) 10 is preferably a web-based application that is hosted on an on-line platform such as the publicly accessible Internet.

The VFAO is accessed by a user, typically a student; however, alternative users may include a student's parents or legal guardians as well as other aforementioned entities also involved in the financial aid process. As a student accesses the VFAO application 10 and features thereof, it preferably appears that he or she is interacting directly with a particular college administration computer system 18. CACS 18 is accessible by service personnel that are responsible for handling financial aid matters for a particular educational institution. It should be appreciated that it is an object of the disclosed system to reduce certain interactive steps and features associated with a typical student financial aid process. One particular such reduction corresponds to the amount of service personnel required to handle financial aid matters at an educational institution. Information is provided to CACS 18 electronically, so a smaller staff is required to handle paperwork from a student. Many other facets of a financial aid office are also automated as a result of the present subject matter to further reduce budget, equipment, and facilities related to financial aid at an educational institution. By utilizing the subject VFAO, it may be possible that a single college service person with access to CACS 18 can oversee and manage almost all student financial aid interaction.

Although the student seemingly interacts with CACS 18, it is a student financial aid processing center (SFAPC) 12 that handles much of the interactive process associated with the subject virtual financial aid system. All information inputted by a VFAO user is sent to SFAPC 12, where processing personnel employ a unique system of software and processing to manage and administer various aspects of the financial aid process, including student financial aid applications, aid awarding, aid certification, and financial aid payments.

The interaction between a user at VFAO 10 and SFAPC 12 is further facilitated by the provision of secure computer systems (SCS), an interface incorporated with SFAPC 12. SCS offers a high level of security (typically at least 120 bits of encryption) such that the information passed between VFAO 10 and SFAPC 12 is held in highest confidence. Both systems are monitored for intrusion by third parties and potential computer-related viruses. Sophisticated algorithms, rules engines, and software available in SCS and SFAPC 12 encapsulate the expertise of human financial aid personnel into an automated system. The specific rules and processes of SFAPC 12 will be discussed in further detail later in the specification. The processes are intended to guide a student through a financial aid process in the way typical financial aid personnel would. Key steps and guidelines related to a financial aid process are pointed out to the student, as they are directed through the subject automated process and system.

In order to provide complete financial assistance to a student, SFAPC 12 must interact with several other entities. SFAPC 12 must interact with CACS 18 to ensure that a student seeking aid is in fact enrolled at that institution. Student information, payment information, and enrollment information correspond to some of the data passed between CACS 18 and SFAPC 12. The United States Department of Education (hereafter abbreviated as "Dept. Ed.") typically handles matters related to federal financial aid, and certain information related to such matters is relayed between appropriate government agencies 16 and SFAPC 12. Other independent financial lenders, or loan guarantors, 14 handle other aspects of a loan process, and thus additional interaction may be necessary between SFAPC 12 and such financial institutions 14. All entities presented in FIG. 1 interact together to provide financial assistance to a student user of the subject VFAO system 10.

One of the most important sources of financial aid available to a student for educational expenses is federal student aid. It should thus be appreciated that VFAO 10 interacts with appropriate government agencies 16 to apply for and administer aid available for post-secondary and other higher education establishments that participate in Title IV of the Higher Education Act. Title IV involves federal financial aid programs that offer Federal Pell Grants, Federal Stafford Loans, Perkins Loans, Federal Work-Study, and Federal Supplemental Education Opportunity Grants. VFAO 10 provides direct links to appropriate entities such as the Dept. Ed. (which is in charge of federal financial aid programs) and others such that all financial aid processes and procedures can be completed online. Traditional procedures have required a student to personally visit these entities. Completing and delivering necessary forms often results in complications. If mistakes or omissions occur while completing financial aid forms, the financial aid process is often delayed, causing frustration and potential financial difficulty for a student. Thus, yet another advantage of the subject VFAO and corresponding processing methodology is minimized time and complications involved in a financial aid application process. More particular features and steps related to VFAO 10 and related system processes will be hereafter presented with respect to FIGS. 2 through 7, respectively.

A particular advantage of the subject VFAO 10 is that it can adjusted to suit the needs and desires of a particular educational institution. Aspects of the web-based application operate under certain established methodology, but specific features thereof may be altered. Types and amounts of financial aid offered by different educational institutions almost always vary, and so do VFAO's 10 that are designed for particular institutions. There are, however, many features of VFAO 10 that are preferably incorporated into all such systems. A VFAO web-based application 10 preferably includes a plurality of direct links to other on-line locations. Such direct links preferably include a link that directs a user to the United States Department of Education's Free Federal Application for Student Assistance (FAFSA) on the Internet. Completion of this FAFSA application is an indispensible initial step of Federal Title IV funding for educational expenses. It is preferably required that a user access FAFSA On-line and obtain an eligibility code from the U.S. Department of Education before beginning the virtual financial aid process displayed in FIG. 3. Another link that is preferably included within a VFAO system is a tax form link that directs a user to the Unites States Internal Revenue Services (IRS) in order to gather tax information required for financial aid evaluation purposes.

Other exemplary services and features of a virtual financial aid office and system are displayed in FIG. 2. One exemplary such feature is an SFAPC electronic messenger (e-messenger) 20. The e-messenger feature 20 is available for a user to automatically send a communication to SFAPC processor personnel. E-messenger service 20 may also be used by a college professional with access to CACS at an educational institution to send an e-mail to SFAPC processor personnel. An entity utilizing the SFAPC e-messenger feature 20 is preferably prompted to enter certain demographic information. Examples of such information might include name, social security number, address, city, state, zip code, and telephone number. It may also be a feature of the e-messenger service 20 to prompt a user to request a preferred response method by which the SFAPC processor personnel will reply to the message. Examples of a response method are an e-mail response or a response via telephone. Once the requested information and the message itself are entered into the VFAO application, the message is e-mailed to a Title IV compliance specialist or other appropriate personnel at an SFAPC. As an alternative to the SFAPC e-messenger service, communication between a student or college professional and an SFAPC processor personnel may be done via telephone. A toll-free telephone line is preferably available for a VFAO user to relay any type of information to SFAPC personnel.

Other features of the virtual financial aid office 10 include a user pin application and access feature 24, a student interview system 26, a financial aid estimator 22, an SFAPC reporting system 28, and an aid review feature 27. These exemplary features and services will be discussed in additional detail throughout the remainder of the specification.

Figure 3:
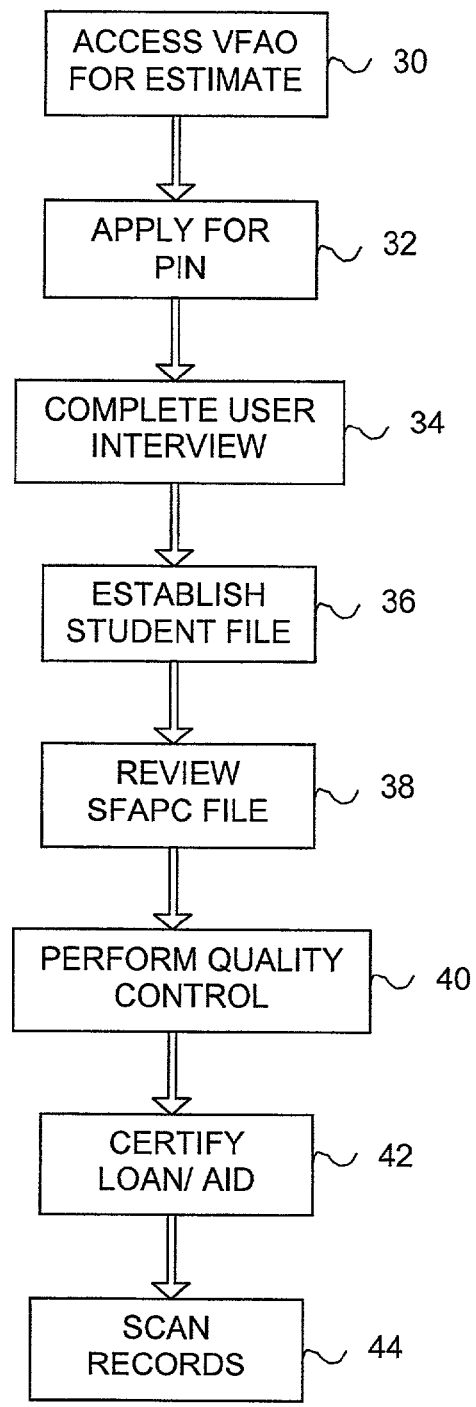
FIG. 3 displays a flow chart of general exemplary process steps employed in accordance with methodology of a virtual financial aid system and features thereof in accordance with the disclosed subject matter.

FIG. 3 displays a flow chart of general exemplary process steps employed in accordance with methodology of a virtual financial aid system. A first step 30 involved with an exemplary VFAO is to access the on-line system and select financial aid estimator option 22 to obtain an estimate of the amount of aid a student will be eligible for. Depending on how an institution wants their estimator service 22 to operate, this aid estimate could include estimates for federal aid as well as for institution-specific aid. Brief personal information is entered by a user, and the estimator service is able to provide a preliminary prediction of the federal financial aid for which they qualify. This is typically the first time that the subject VFAO system requests information about a student, and so it may hereafter be referred to as a first information collection application. If an estimator service is to provide a potential student with a reasonable estimate of the amount of money he or she will receive from institution-specific funding, including scholarships, additional questions must be answered in step 30. Examples of the type of questions that might be asked could relate to high school grade point average (GPA), Scholastic Aptitude Test (SAT) scores, or various group affiliations, including voluntary information on race or religion (if applicable). Once the appropriate questions are answered by a user, an estimate of various amounts of financial aid (such as grant amount, loan amount, scholarship amount, etc.) will be provided to the student. This exemplary feature of VFAO 10 is preferably processed instantaneously such that a user is automatically provided with an on-line estimate.

If a student is satisfied with his or her financial aid estimate, then he or she preferably proceeds to step 32, in which he or she applies for a personal identification number (PIN). The PIN will allow a user to have access to later steps in the financial aid process. The estimator feature 22 is preferably one of the only features that a user can access without applying for and obtaining a PIN. Once in the on-line VFAO system, a user selects the user pin application and access feature 24 (See FIG. 2) and is linked to a site that provides a secure method of collecting private data from the student. Exemplary questions asked as part of the PIN application process may include personal data such as name, social security number, address, telephone, date of birth, drivers license number and also data for an additional reference. Selected of this private data is to be used in conjunction with the issued PIN as an electronic signature as the user moves through the student financial aid process.

Once the PIN application is satisfactorily completed, a user will immediately be issued a secure PIN, which can then be printed to keep for personal reference. In addition to the on-line issuance, a user is preferably also sent a letter via U.S. mail informing them of their PIN. An individuals PIN is preferably not able to be obtained by anyone other than the user. If a user forgets his or her PIN, they can still apply for a new PIN using their social security number and selected demographic data. The provision of such particularly selected information allows the virtual financial aid system to cancel the old PIN and issue a new one.

After applying for and obtaining a PIN in step 32, a VFAO user may proceed to step 34 in which he or she completes a user interview. This step is accessed by selecting feature 26, a student interview system, from the available options in VFAO system 10. Selection of the interview feature 26 prompts a user to input his or her social security number and PIN to gain proper access. A user's PIN will also be used throughout the interview process to affirm statements presented to a user and to acknowledge that the user is in full understanding of the financial aid process, amount of aid for which he or she is applying, repayment considerations, etc. This provision of the PIN or other select information corresponds to a user's electronic signature throughout the financial aid process. Once a user's PIN and social security number have been entered, the student interview application is automatically populated with specific demographic information that is already known about the student. This data is carried over from information provided in the PIN application step 32, and helps a user avoid having to re-enter previously entered information.

The information requested during the step of completing a user interview 34 may vary from institution to institution, but such information preferably includes additional personal data such as data corresponding to a student's parents or other family members, institution specific information such as school, other institutions attended, degree(s) sought, class in school, number of classes and hours planning to take, and financial planning information such as cost of tuition, books, living expenses, etc. The provision of information associated with the student interview process may hereafter be associated with a second information collection service of the subject virtual financial aid office. Once a user enters all the requested information, he or she may then preferably be able to print a copy of the interview results to retain for personal files. A completed interview is then automatically submitted to SFAPC 12.

When a completed student interview is received by SFAPC 12, SFAPC or processing personnel therewith establishes a personal student financial aid file in step 36 that will contain the interview information and other information related to the financial aid process. As soon as SFAPC receives the interview information and sets up a corresponding student file, SFAPC 12 automatically begins a computerized search for the student's Institutional Student Information Report (ISIR). An ISIR is the result of a student having filed the FAFSA application through the Department of Education (Dept.Ed.). The ISIR is simply a voucher-type document indicating student status regarding eligibility for federal student aid. If the results of a FAFSA application are available, then upon the SFAPC's computerized search, the Department of Education (Dept.Ed.) electronically sends a copy of the ISIR to the SFAPC. The ISIR is then preferably printed and placed in the student's file. Additional steps in the virtual financial aid process cannot continue without receipt of a student's ISIR, and so all student interview information is put on hold until an official ISIR document is received.

Once the ISIR is received from the Dept. Ed., SFAPC 12 then interacts with the educational institution the student plans to attend. Electronic communication with a particular CACS 18 then ensues so as to obtain demographic matches with the student to ensure that he or she has enrolled in the institution. In the remainder of the specification, the institution's matching demographic data will be systematically referred to as "E-Demo." When a student has completed the financial aid application with the SFAPC 12, but has not completed an application to the educational institution, the virtual financial aid process is placed on hold. Thus, file review step 38 does not preferably occur until E-Demo information is received by the SFAPC 12. Those files needing such further documentation preferably have the needed information logged in a computer software holding file. The holding file may preferably reside in a specified location among software and associated databases provided at SFAPC 12. When further information is checked for yet subsequently unavailable in the tracking system, students are preferably sent an automated letter via e-mail and regular postal mail to specifically request the additional required information.

Once SFAPC 12 receives a student's interview, ISIR, and E-demo information, a student's file is then preferably officially activated. Specialized software available to SFAPC 12 assists processing personnel with initial analysis of a student file, as well as subsequent record keeping and recording processes. This marks the start of step 38, the review of a student's SFAPC file. SFAPC 12 uses a file review checklist for each student file review to assure accuracy and consistency in the review process 38. The file receives a preliminary review to determine if any additional documentation is needed. Those files not requiring further documentation are relayed to financial aid processing personnel for personal review.

SFAPC software preferably includes a tracking function that informs SFAPC of items of documentation that may be missing from a student's file. Such document information may preferably also be available to an institution's CACS to offer on-line tracking of a student's financial aid processing progress. The financial aid processing progress for students at a particular institution is something that can be monitored by an institution's CACS via feature 28 of an exemplary VFAO (see FIG. 2). Feature 28, SFAPC reporting system, can provide multiple reports related to individual students or all students at an institution who have applied for financial aid. Available tools are essentially management reports for an institution's financial aid personnel to pinpoint individual or universal student advancement in the Title IV process. It is preferred that college professionals can only use these reporting tools with proper approval from both the institution and SFAPC management. Proper approval may typically correspond to user application, signature of various confidentiality statements, and assignment of a user name and password. Approved service personnel at an institution can then look up specific information via the on-line VFAO system about particular student(s). Examples of the type of information one may want to look up include student reports, outstanding compliance issues, and students listed as past a certain number of days (e.g. 30 or 45 days) in responding to document requests. An exemplary detailed student report for any or all students at an institution may include data such as student name, social security number, whether or not an interview was submitted, current interview status, school term for the financial aid, whether or not an ISIR is on file, whether or not E-demo information has been received, and start and end dates for compliance review. Similar financial aid processing progress may also preferably be available to a registered student. Such a service 27 may be selected from an exemplary VFAO 10, as displayed in FIG. 2, for monitoring the progress of the financial aid process.

Once all required documentation has been received and a financial aid professional has sufficiently reviewed a file in step 38 and ensured to the best of their ability that Dept. Ed. regulatory standards are met, the next step 40 begins. A student file is relayed to an SFAPC quality control manager, preferably a more experienced financial aid officer, for performing quality control in step 40. The purpose of step 40 is to assure that each file complies with federal standards. Such federal standards and guidelines are constantly changing, and thus step 40 must correspond to a very thorough and appropriately updated review. During the quality control review step 40, a quality control manager may preferably use the same processing checklist that was originally generated and used in step 38 to guide him or her through this final file review. A file with errors is preferably returned to a financial aid professional for correction or provision of additional information. If a student's file passes quality control step 40 with no errors, then that student is preferably mailed an official award notice providing information about the type and amount of financial aid for which he or she officially qualifies.

Once the file is completed, loans and aid must be certified in step 42. A loan certification specialist from the SFAPC preferably goes on-line to certify with a financial lender 14, such as a bank or guaranty agency, that the aid or loan(s) have been certified.

A final step in the virtual financial aid process is to scan student records 44. When a file is completed and closed, it is placed in a record box to be manifested for pickup once a week by a record scanning company. All files are preferably scanned and copied to a CD-ROM. It is preferred that one copy of the CD-ROM remain with the scanning company, one copy returned to the SFAPC, and one copy sent to the appropriate educational institution. All paper records are then preferably sent to storage for a predetermined period of time, for example three years. Any updates to a student file that may result from new documentation or student advancement in school, are then preferably added to the student's computer record.

Whenever a student's file or copies thereof need to be accessed, software is preferably available to the SFAPC such that any or all file documents can quickly be electronically retrieved, reviewed on screen, printed, or sent to an institution via e-mail. This feature may be particularly useful for providing selected financial information to a system manager or auditor of a government agency, who often requests certain such file information.

There are many steps undertaken by various processing entities such as an SFAPC that encompass the subject virtual financial aid methodology. These steps are particularly embodied in FIG. 3 as the steps of establishing a student file 38, reviewing an SFAPC file 38, performing quality control 40, and certifying aid 42. These steps are the most imperative to successful review and processing of a student's financial aid application. Additional details related to these steps are hereafter presented with reference to FIGS. 4, 5, 6 and 7.

Figure 4:
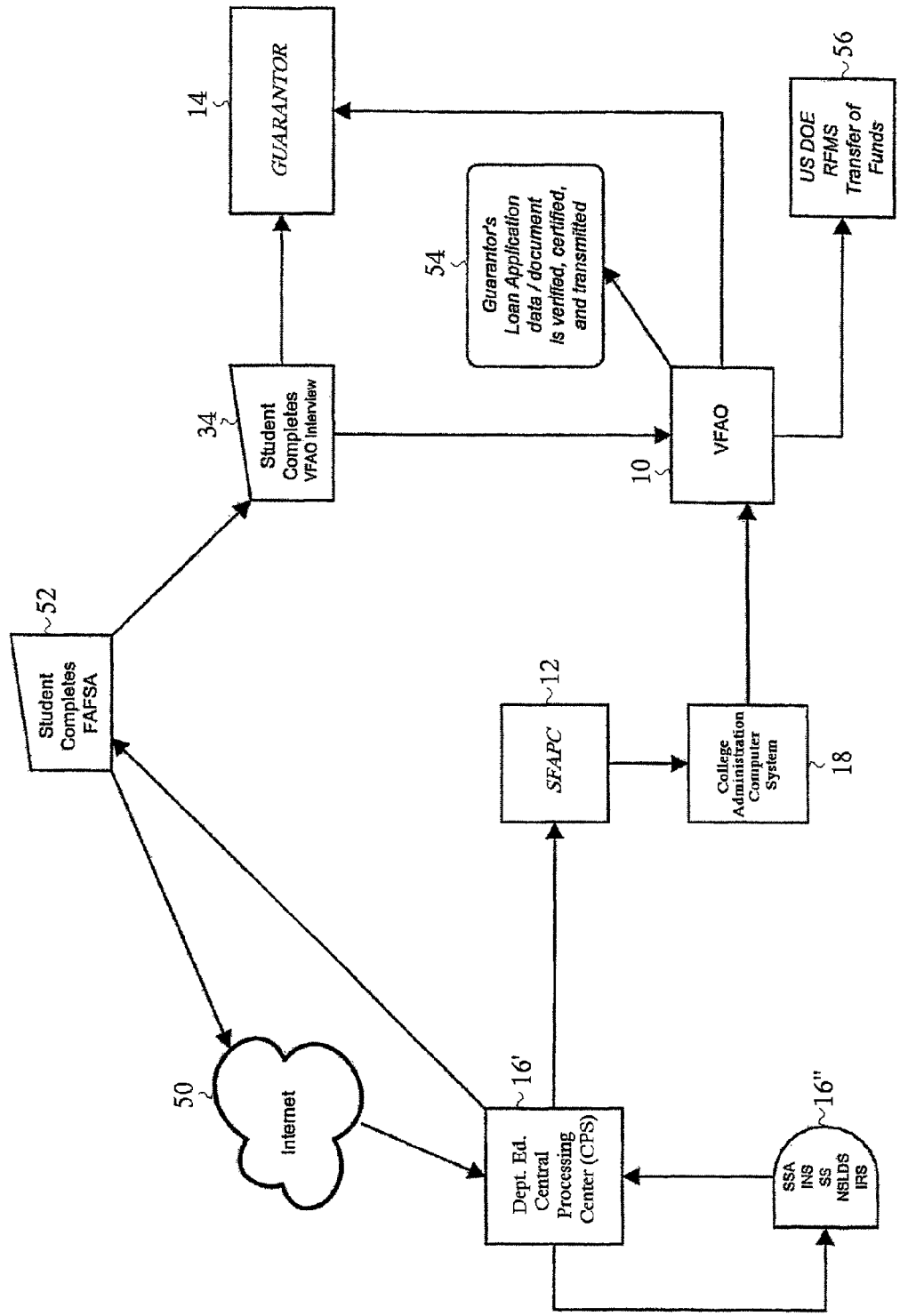
FIGS. 4 through 7, respectively, display flow charts of more particular process steps employed in accordance with methodology of a virtual financial aid office; and wherein FIG. 4 demonstrates aspects and steps corresponding to an exemplary process of completing a user interview in accordance with the virtual financial aid system of the present subject matter.

FIG. 4 demonstrates aspects and steps corresponding to interactive communication and flow of information among various entities in accordance with the subject virtual financial aid system. Once a student decides that he or she will need financial assistance, he or she first completes a FAFSA application in step 52. Once the FAFSA is completed, it is electronically submitted over the Internet 50, or other appropriate web-based environment, to the Department of Education's Central Processing System (CPS) 16'. The Dept. Ed.'s CPS then communicates with other government agencies 16" such as the Social Security Administration (SSA), Immigration and Naturalization Service (INS), Selective Service (SS), National Student Loan Data System (NSLDS), and Internal Revenue Service (IRS) to verify information reported on the FAFSA application. The respective government agencies 16" report their findings back to the Dept. Ed.'s CPS. This reporting process among government agencies may typically take 7 to 21 days to complete, depending on the volume of FAFSA applications the CPS has to process. Once the FAFSA is processed, Dept. Ed. CPS 16' typically sends a student aid report (SAR) to the student via US Mail. Also, SFAPC 12 preferably receives the electronic Institutional Student Information Report (ISIR) via the Student Aid Internet Gateway (SAIG), formerly referred to as the Title IV Wide Area Network (TIV WAN). The SAR provided to a student may request that the student provide his or her educational institution with documents to verify information that INS, SSA, SS, and NSLDS were not able to verify. This information may then preferably be requested at a later date by an SFAPC. The ISIR information sent to SFAPC 12 is then preferably routed to a college administration computer system 18 (or administration computer system of another type of educational institution). The ISIR information is then also preferably routed to a database associated with the actual virtual financial aid office 10.

When a FAFSA is submitted to CPS 16', the student typically receives an estimated family contribution (EFC) document in the form of an on-line confirmation. The student then uses the information provided in the EFC document to complete the on-line student interview via the VFAO system in step 34. A student preferably submits the information electronically to guarantor 14, and to VFAO 10 where the system preferably holds the interview on-line until it receives the required ISIR information. It may also be required for a student to send additional loan application information to loan guarantor or lender 14. This loan application information may be in the form of master promissory note (MPN). If a lender such as Sallie Mae with on-line Laureate website is used, then the MPN may be relayed electronically. If the lender is not a Laureate Lender, then a paper MPN may be transferred. At step 54, the guarantor's loan application data and other documents are verified, certified and transmitted. The ISIR, interview information, MPN and other significant information in a student's file is processed. When all compliance issues are resolved, student aid eligibility can then be determined. When information is received or processed, the system of a guarantor or lender 14 is updated with a student's current information and the loan can be certified and transmitted. The US Department of Education will preferably transfer funds at step 56 via their Recipient Financial Management System (RFMS) when the funds are verified and requested at a later date.

Figure 5:
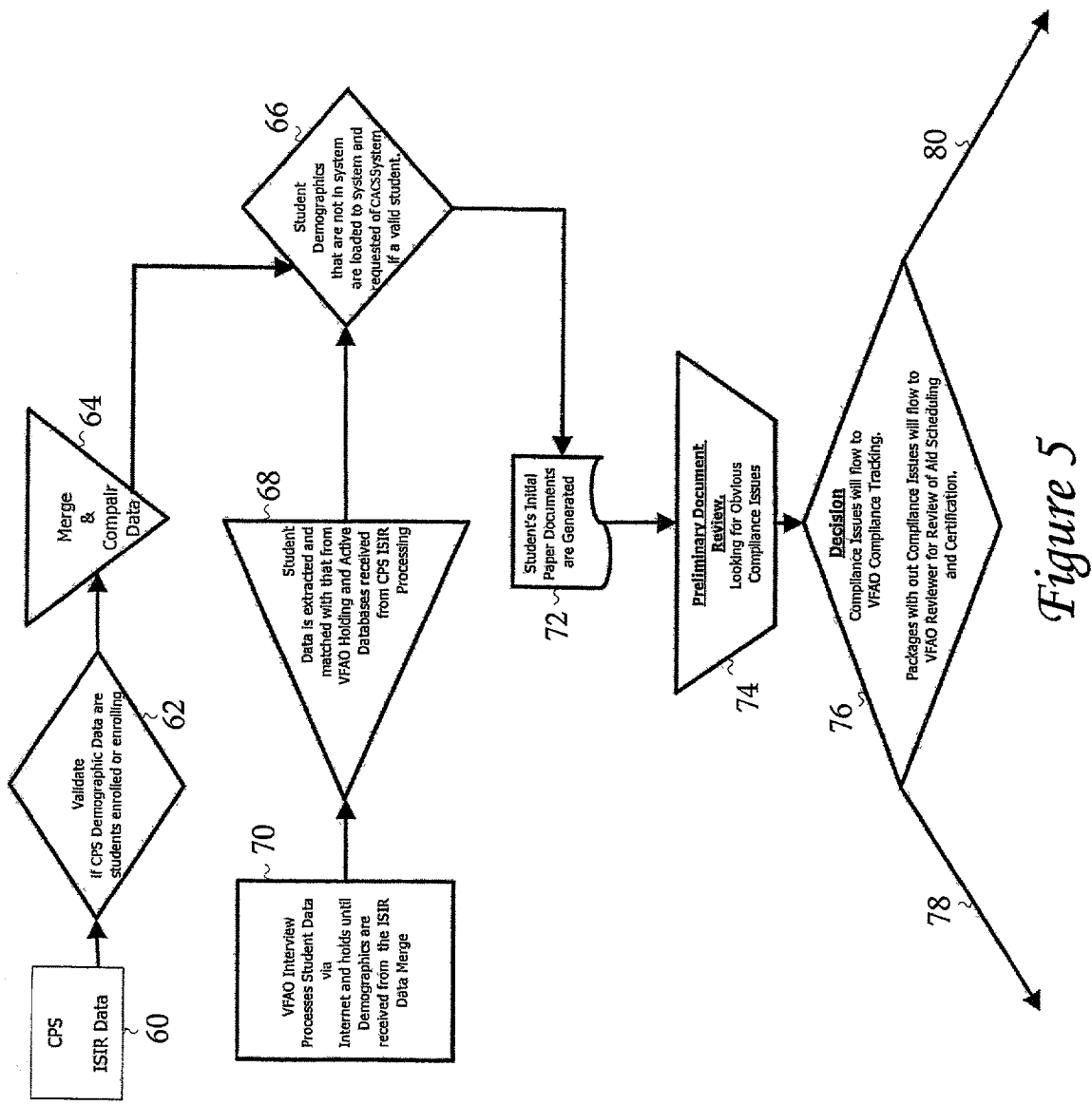
Figure 6:
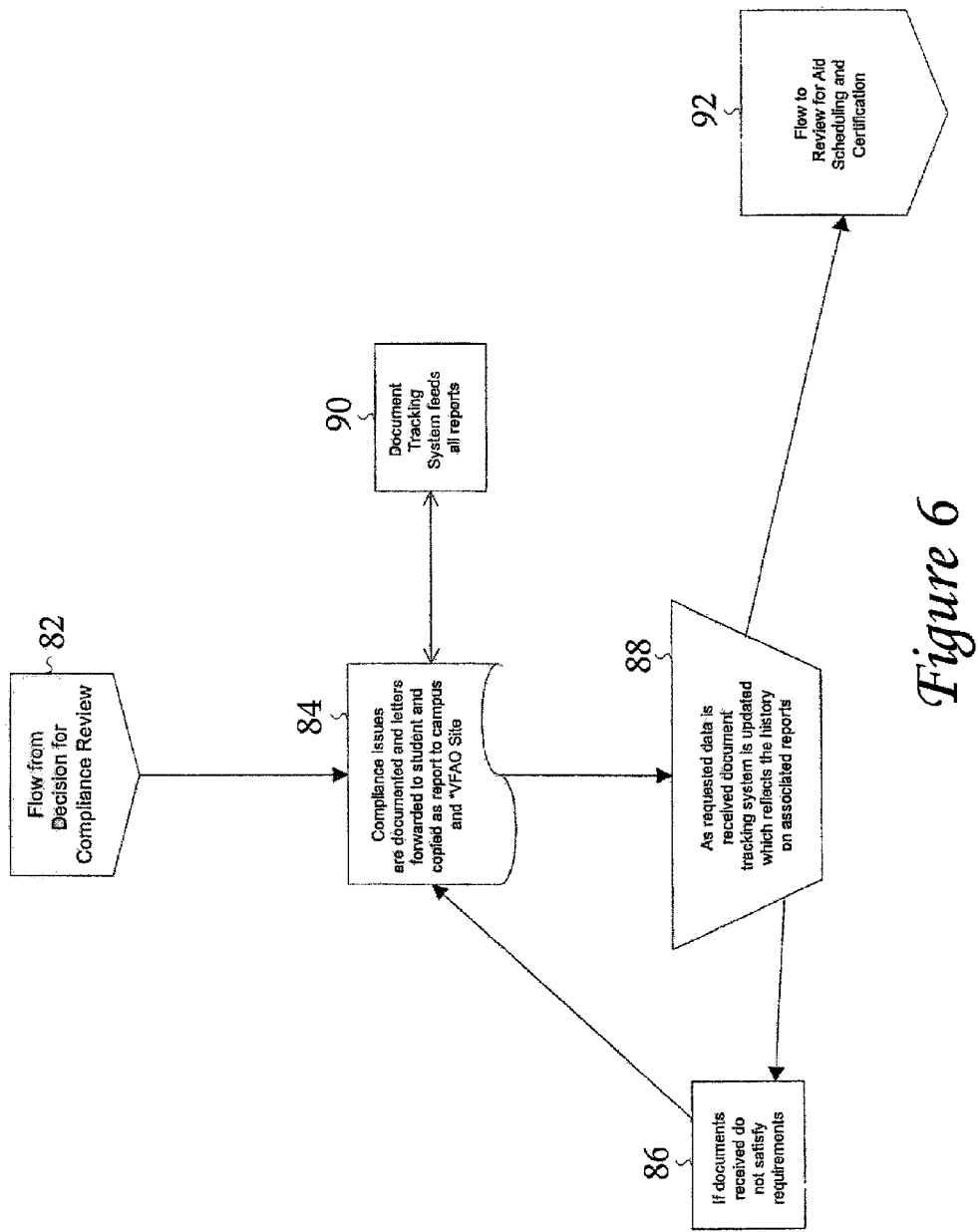

FIG. 5 displays a flow chart of various additional steps related to the process of establishing a student file and selected aspects of file review. A VFAO system 10 preferably receives student interview data via the Internet at step 70, and then sends that data to either a holding database or an active database until additional demographic information is received. This additional information is typically in the form of an ISIR, and when received, all information is merged. In step 68, any data that is received from CPS ISIR processing is then matched with data extracted from active and holding databases in the VFAO application. CPS and ISIR data 60 is then validated in step 62 depending on whether a student is enrolled or is enrolling at that educational institution. Step 64 merges and ensures correct comparison of this validated ISIR information with a student's interview information, and student information is then stored in an active status database. In step 66, any student demographic information that is not already stored in the system is requested from the proper entity and loaded into the on-line financial aid system. In preferred embodiments of the subject system, steps 60 through 70 collectively take about a day to occur.

Once all the necessary data is extracted and compared, the student's initial paper documents are generated into a hard copy file in step 72. Step 72 also preferably takes no longer than a day to complete, and generated documents include an ISIR, student interview information, academic transcripts, a NSLDS printout, and an audit sheet. All new files then undergo a preliminary document review for obvious compliance issues in step 74. Exemplary compliance issues that are considered in step 74 include data verification, class registration, citizenship status, selective service registration, previous loan defaults or bankruptcies, permanent disabilities, social security name conflicts, and others. After a preliminary review 74, a file is then preferably subjected to a decision process 76, which effectively separates the files into two different categories. Files with compliance issues flow to a compliance review via path 78. Files without compliance issues are considered workable and flow along path 80 to a review stage for aid scheduling and certification. The additional review stage will ensure that other issues such as loan period overlaps, academic credit issues, and unsatisfactory academic progress, do not arise.

When a document flows to compliance review 78, additional file review preferably occurs. The SFAPC determines what documents are needed to overcome the compliance issues. The issues are then documented in step 84 and corresponding letters are forwarded to the student requesting the needed information. Corresponding compliance status is also reported to the student's educational institution via the VFAO on-line application. Reports that are thereafter obtained by an SFAPC, are relayed at step 90 via the SFAPC's tracking system to the VFAO system. As requested data is received from a student or other entity, files are again reviewed to verify that sent documents satisfy existing compliance issues. The tracking system is updated at step 88 to reflect any change in the status of a student's compliance issues. If received documents do not satisfy compliance requirements 86, then compliance issues are once again documented and reported in step 84. If the documents do satisfy all compliance issues, then the student's file flows to review for aid scheduling and certification at step 92.

Figure 7:
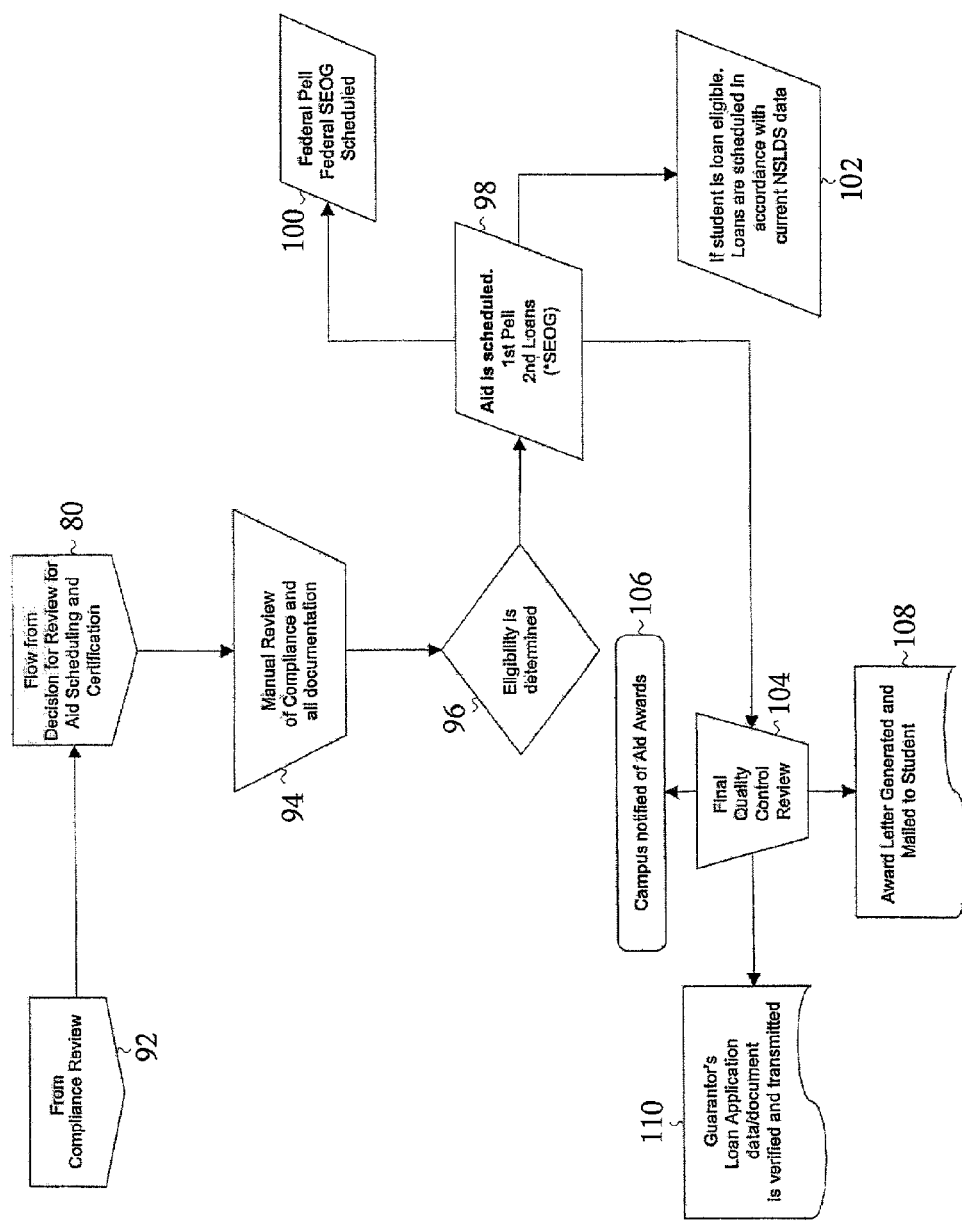

More details are presented in FIG. 7 as related to the process of quality control and review for aid scheduling and certification. Files received from compliance review 92 and from the decision process at step 80 proceed to the step 94, where an SFAPC processor performs a manual review of student eligibility and compliance issues. The processor preferably ensures that all required documents are completed and a corresponding file is ready for additional work. SFAPC processor then preferably determines what aid the student is eligible for at stage 96 and schedules aid in step 98 according to a student's eligibility and financial plan. Federal Pell Grants are preferably scheduled first, with a maximum eligible amount awarded based on a student's attendance status. Any remaining financial assistance is then compensated for with loan scheduling at step 102 in accordance with current NSLDS data. Federal Supplemental Education Opportunity Grants (FSEOG) may also be separately scheduled at step 100. FSEOG eligibility is determined from a student's EFC and a corresponding availability of funds from a student's educational institution. This typically a first-come-first-serve type aid and not all students eligible for Federal Pell Grants are eligible to receive this aid. After aid scheduling, a final quality control review 104 preferably occurs. After passing quality control review, an award notice is generated by a quality controller 108, which is then mailed to the student and copied to the educational institution. At step 110, data or documents corresponding to a guarantor's loan application is then verified and sent to the lender or loan service center.

There are several unique services that are offered in the exemplary virtual financial aid office described above and in accordance with the presently disclosed technology. It should be appreciated that other exemplary embodiments of a virtual financial aid system could comprise varied selected combinations of such services, features and methods, without departing from the spirit and scope of the claimed subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-readable medium comprising instructions for executing a web-based application for providing a multi-level financial aid system featuring integrated and automated on-line financial aid features specific to a given educational institution to a user, wherein said web-based application comprises:

a first information collection service for obtaining requested personal and financial information about a given student;

a financial aid estimation service for evaluating the information obtained via said first information collection service and generating a predicted amount of monetary aid that may be available for the student to use for education-related expenses at a given educational institution;

a federal link service for receiving an electronic copy of an Institutional Student Information Report (ISIR) document for the given student;

a service for comparing information obtained via said first information collection service and the given student's ISIR document;

a service for determining an authorized amount of financial aid the given student is eligible for at the given educational institution; and a service for providing an award notice to the given student based on the determination of authorized financial aid eligibility.

2. A computer-readable medium comprising instructions for executing a web-based application for providing a multi-level financial aid system as in claim 1, wherein said web-based application further comprises a registration service for applying for and receiving a user identification element, and whereby said user identification element is utilized for obtaining future access to said web-based application, including various features and services thereof.

3. A computer-readable medium comprising instructions for executing a web-based application for providing a multi-level financial aid system as in claim 2, further comprising a second information collection service, for obtaining additionally requested information related to personal demographics, financial matters, and educational endeavors of a given student.

4. A computer-readable medium comprising instructions for executing a web-based application for providing a multi-level financial aid system as in claim 1, further comprising a federal link service for electronically relaying federal aid eligibility information between the web-based application and processing systems of selected government agencies, wherein one of said selected government agencies corresponds to the United States Department of Education.

5. A computer-readable medium comprising instructions for executing a web-based application for providing a multi-level financial aid system as in claim 4, wherein selected information obtained via said student file establishment service comprises information obtained via said first information collection service and said second information collection service, federal aid eligibility information obtained via said federal link service, and enrollment information about a given student obtained from an educational institution.

6. A computer-readable medium comprising instructions for executing a web-based application for providing a multi-level financial aid system as in claim 5, further comprising a file processing service for reviewing information collected about a given student via said file establishment service and for determining eligibility for various types of financial aid that are potentially available for a student.

7. A computer-readable medium comprising instructions for executing a web-based application for providing a multi-level financial aid system as in claim 6, further comprising a loan application service for electronically relaying master promissory note (MPN) documentation between a system user and a loan guarantor, wherein said loan guarantor is characterized as one who provides monetary assistance to a student for education-related expenses.

8. A computer-readable medium comprising instructions for executing a web-based application for providing a multi-level financial aid system as in claim 4, wherein said federal Did link service provides links at the web-based application for directly connecting a user to a FAFSA on-line web-based location and to an IRS on-line web-based location.

9. A computer-readable medium comprising instructions for executing a web-based application for providing a multi-level financial aid system as in claim 6, further comprising an integrated feature that automatically updates the web-based application, particularly updating information related to received documents and progress of financial aid processing.

10. A computer-readable medium comprising instructions for executing a web-based application for providing a multi-level financial aid system as in claim 8, further comprising a reporting system service available to a user of the web-based application, for obtaining updated information about the financial aid system and progress involved with said file processing service thereof.

11. A computer-readable medium comprising instructions for executing a web-based application for providing a multi-level financial aid system as in claim 6, further comprising a communications service for automatically generating and sending an electronic communication from a student or educational institution to a student financial aid processor.

12. A computer-readable medium comprising instructions for executing a web-based application for providing a multi-level financial aid system as in claim 2, wherein the user identification element received via said registration service is utilized as an electronic signature for affirming various statements presented in accordance with the multi-level financial aid system.

13. A computer-readable medium comprising instructions for executing a web-based application for providing a multi-level financial aid system as in claim 1, further comprising a service for obtaining enrollment verification information for the given student from one or more specified educational institutions.

14. A computer-readable medium comprising instructions for executing a web-based application for providing a multi-level financial aid system as in claim 1, wherein selected portions of the information obtained from said first information collection service, said service for obtaining a copy of an !SIR document and said service for obtaining enrollment verification information are reviewed by a financial aid processing center.

15. A computer-readable medium comprising instructions for executing a web-based application as in claim 1, further comprising a service for determining whether the given student's corresponding information complies with federal regulatory standards for financial aid eligibility.

16. A computer-readable medium comprising instructions for executing a web-based application, for providing a multi-level financial aid system featuring integrated and automated on-line financial aid features specific to a given educational institution, wherein said web-based application comprises:

an information collection service for obtaining requested personal and financial information about one or more students;

a financial aid estimation service for evaluating the information obtained via said first information collection service and generating a predicted amount of monetary aid that may be available for each student to use for education-related expenses at a given educational institution;

a service for determining an authorized amount of financial aid each student is eligible for at the given educational institution;

a service for providing an award notice to each student based on the determination of authorized financial aid eligibility;

a reporting service, available to the given educational institution, for generating reports of selected students and their respective financial aid packages;

a federal link service for receiving an electronic copy of an Institutional Student Information Report (ISIR) document for the given student; and a service for comparing information obtained via said first information collection service and the given student's ISIR document.

17. The computer-readable medium comprising instructions for executing a web-based application of claim 16, further comprising a registration service for applying for and receiving a user identification element for gaining subsequent access to said web-based application, including various features and services thereof.

18. The computer-readable medium comprising instructions for executing a web-based application of claim 16, wherein said federal link service provides links at the web-based application for directly connecting a user to a FAFSA on-line web-based location and to an IRS on-line web-based location.

19. The computer-readable medium comprising instructions for executing a web-based application of claim 16, further comprising a service for obtaining enrollment verification information for the given student from one or more specified educational institutions.

20. The computer-readable medium comprising instructions for executing a web-based application of claim 16, further comprising a service for determining whether the given student's corresponding information complies with federal regulatory standards for financial aid eligibility.

21. The computer-readable medium comprising instructions for executing a web-based application of claim 16, further comprising a loan application service for electronically relaying master promissory note (MPN) documentation between a system user and a loan guarantor, wherein said loan guarantor is characterized as one who provides monetary assistance to a student for education-related expenses.

* * * * *